July 9, 1929.   L. SCHOMBOURGER   1,719,905

DYNAMO ELECTRIC MACHINE

Filed April 6, 1927

Inventor:
Lucien Schombourger,
by *Alexander S. Lunt*
His Attorney.

Patented July 9, 1929.

1,719,905

UNITED STATES PATENT OFFICE.

LUCIEN SCHOMBOURGER, OF ST.-OUEN, FRANCE, ASSIGNOR TO GENERAL ELECTRIC COMPANY, A CORPORATION OF NEW YORK.

DYNAMO-ELECTRIC MACHINE.

Application filed April 6, 1927, Serial No. 181,531, and in France April 26, 1926.

My invention relates to dynamo-electric machines and in particular to a novel manner of exciting the communtating poles of commutator type dynamo-electric machines.

My invention is particularly applicable to alternating current commutator machines employed for regulating the secondary current of induction motors in systems where the range of speed regulation is not excessive and where the commutator machine is driven at constant or approximately constant speed. In such installations the variation in frequency of the currents in the various circuits of the commutator exciting machine is not excessive and the main excitation of the exciting machine is approximately proportional to the load.

It has heretofore been proposed to excite the commutating poles of such machines by a winding connected in series with the load circuit of the machine. This simply gives an interpole excitation proportional to the load, whereas it is desirable that it should be preportional to the product of the load and the frequency because the electromotive force to be compensated is proportional to the load and the frequency.

I have discovered that the desired excitation for the commutating poles under these conditions may advantageously be derived either directly or indirectly from the main exciting circuit of the machine, for example by connecting the commutating pole exciting windings in shunt to a suitable portion of the main exciting winding of the machine. Under the conditions above specified the main excitation is approximately proportional to the load and consequently a commutating pole exciting circuit connected as indicated above will have impressed upon it a voltage having a component which is proportional to the load. In addition, there will be a voltage component proportional to the frequency by reason of the fact that the frequency pulsations in the main exciting poles will build up a voltage across the main exciting winding, or across suitable portions thereof, which is proportional to the frequency.

Figure 1:
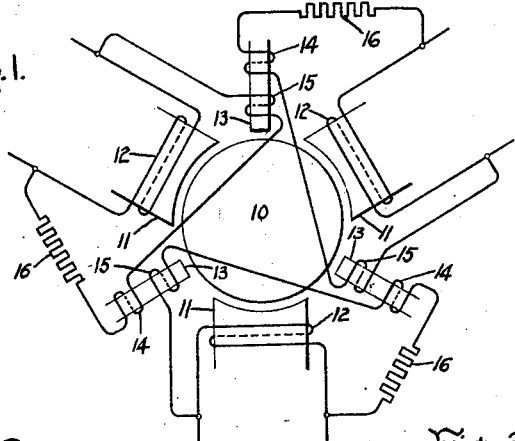
Figure 2:
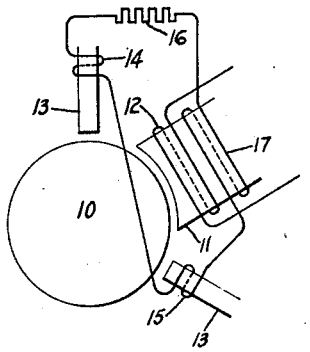
Figure 3:
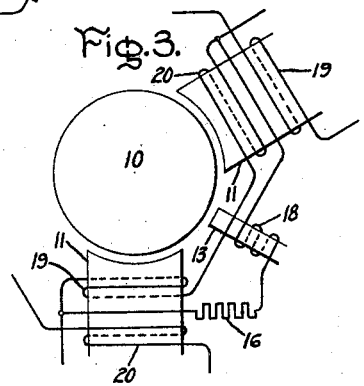
Figure 4:
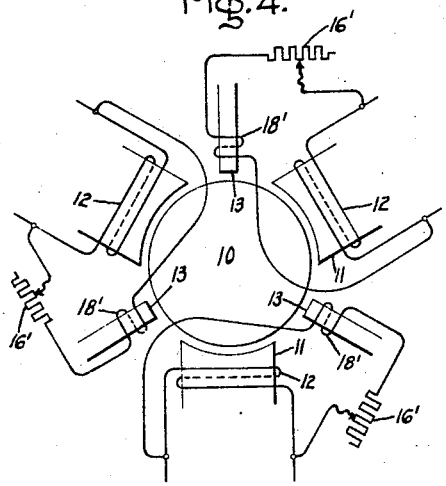
Figure 5:
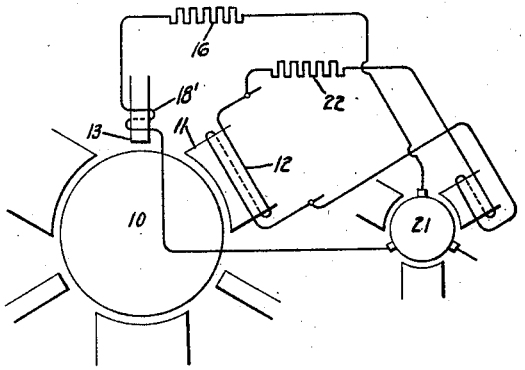

The features of the invention which are believed to be novel and patentable will be pointed out in the claims appended hereto. For a better understanding of the invention, reference is made in the following description to the accompanying drawing showing several applications of the invention in which Fig. 1 shows the commutated pole windings made up of winding sections connected in shunt to different main field windings so as to obtain the proper phase relation of the commutating pole flux; Fig. 2 shows an equivalent arrangement for exciting these sections in which the main field pole winding acts as the primary of a transformer with respect to a secondary circuit supplying the commutating pole winding sections; Fig. 3 shows a single commutating winding per pole supplied from a shunt circuit connected across two adjacent main pole winding sections; Fig. 4 shows a simpler arrangement where the correct phase relation for the average frequency is obtained by the aid of an adjustable impedance in the commutating pole exciting circuit, and Fig. 5 shows how the commutating pole excitation may be amplified by an auxiliary exciter.

Referring to Fig. 1 of the drawing, 10 represents the armature, 11 the main field poles, 12 the main exciting windings, and 13 the commutating poles of an alternating current commutator machine which is intended to operate at substantially constant speed over a limited range of frequency, or under such conditions that the main field excitation will be approximately proportional to the load. The commutating poles 13 are provided with two winding sections, 14 and 15, per pole. One section is excited from a circuit connected in shunt to the main field windings on one side of a commutating pole and the other section is excited from a circuit connected in shunt to the main field winding on the other side of the same commutating pole. The two sections 14 and 15 are reversely connected. Each such exciting circuit contains two commutating pole winding sections on different poles. These commutating pole winding sections generally have a higher ratio of reactance to resistance than the main exciting windings so that additional resistances 16 are included in the commutating pole exciting circuits to give the parallel connected circuits approximately the same time constants. The resultant excitation of each commutating pole is thus made to have the correct phase relation intermediate between that of the two adjacent main poles. The excitation of the commutating poles has a component proportional to the main excitation, or to the load on the machine and a component proportional to the frequency due to the corresponding frequency pulsations in the main poles.

Instead of connecting the commutating pole exciting circuits in shunt to the main pole exciting windings, we may supply them from a secondary winding 17 on the main poles, as is indicated in Fig. 2. Here coils 12 and 17 constitute the primary and secondary coils of a transformer and the main pole 11 the core of the transformer. It is obvious that such a transformer might be placed in the main exciting circuit external to the machine itself if desired.

Fig. 3 shows how the coil sections 14 and 15 of Fig. 1 and their exciting circuits may be combined. In this case each main pole may have two winding sections 19 and 20 reversely connected. Section 19 of one main pole will be connected in series with section 20 of the next adjacent main pole and this will make one of the main pole exciting circuits of which there will be three in a three-phase machine. The intermediate commutating pole winding 18 will be connected across the outside terminals of one of these main pole exciting circuits. There will then be transformer action between the coil sections on each main pole which will impress a resultant voltage of the desired phase relation on the exciting circuit of the interpoles which voltage is proportional to the main pole excitation and to the frequency.

Fig. 4 represents a simple arrangement of the invention which may be used where the commutation requirements are not too exacting. The single winding 18′ of the interpoles 13 are connected in shunt to adjacent main exciting winding 12 suitably selected so that by placing an adjustable impedance 16′ in this shunt circuit the phase of the interpole current may be adjusted to have a 30 degree phase relation (in this case) with respect to the voltage at the terminals of the main pole field winding at the average frequency at which the machine is to operate. The compensation is imperfect at other frequencies but by a judicious choice of the frequency for which the adjustment is made exact, we may in many cases obtain a desirable degree of a compensation at a minimum cost.

Fig. 5 is a modification which illustrates how the current taken from the main exciting circuit may be reduced. The same principle may be used in any of the modifications. Here an auxiliary exciter 21 is employed to amplify the excitation between the terminals of the main exciting winding 12 and the interpole winding 18′. The resistances 16 and 22 included in the exciting circuit of the commutating winding 18′ and of the exciting circuit of the auxiliary exciter 21 are selected and included for the same reasons as explained above and the same principles above outlined apply. The two exciters represented will preferably be mounted on the same shaft.

In accordance with the provisions of the patent statutes, I have described the principle of operation of my invention, together with the apparatus which I now consider to represent the best embodiment thereof; but I deside to have it understood that the apparatus shown and described is only illustrative, and that the invention may be carried out by other means.

What I claim as new and desire to secure by Letters Patent of the United States, is,—

1. A variable frequency alternating current commutator machine having main and commutating poles, windings on the main poles for supplying the excitation of said machine, and windings on the commutating poles connected in shunt to suitable portions of the main pole exciting windings for supplying a commutating pole excitation proportional to the main pole exciting flux and to its frequency.

2. A variable frequency alternating current commutator machine having main and commutating poles, windings on the main poles for supplying the excitation of said machine, and windings on the commutating poles connected in shunt to portions of the main pole windings for supplying a commutating pole excitation proportional to the main pole exciting flux and to its frequency, said shunt connections being chosen to bring about the proper phase relation between the main pole and commutating pole excitations.

3. A variable frequency alternating current commutator machine having main and commutating poles, windings on the main poles for supplying the excitation of said machine, windings on the commutating poles connected in parallel to suitable portions of the main pole windings for supplying a commutating pole excitation proportional to the main pole exciting flux and to its frequency and fixed impedances in the commutating pole exciting circuits for properly proportioning the time constants of said parallel connected circuits.

4. A variable frequency alternating current commutator machine having main and commutating poles, windings on the main poles for supplying the excitation of said machine, windings on the commutating poles connected in shunt to suitable portions of the main pole exciting windings for supplying a commutating pole excitation proportional to the main pole exciting flux and to its frequency, said parallel connections being so chosen as to bring about the proper phase relation between the main pole and commutating pole excitations, and fixed impedances in the connections to the commutating pole windings for equalizing the time constants of said parallel connected circuits.

5. A variable frequency alternating current commutator machine having main poles, commutating poles between said main poles, windings on said main poles for supplying the excitation of said machine, exciting winding on the commutating poles, and parallel circuit connections between the windings on the main poles and the intermediate commutating poles arranged to produce a commutating pole excitation proportional to the main pole excitation flux and to its frequency having a phase angle intermediate between the phase angles of such main pole excitations.

In witness whereof, I have hereunto set my hand.

LUCIEN SCHOMBOURGER.